United States Patent [19]
Gozdz et al.

[11] Patent Number: 5,478,668
[45] Date of Patent: Dec. 26, 1995

[54] RECHARGEABLE LITHIUM BATTERY CONSTRUCTION

[75] Inventors: Antoni S. Gozdz, Tinton Falls; Caroline N. Schmutz, Eatontown; Jean-Marie Tarascon, Martinsville; Paul C. Warren, Far Hills, all of N.J.

[73] Assignee: Bell Communications Research Inc., Livingston, N.J.

[21] Appl. No.: 241,255

[22] Filed: May 11, 1994

Related U.S. Application Data

[63] Continuation-in-part of Ser. No. 160,018, Nov. 30, 1993.
[51] Int. Cl.$^6$ .............................. H01M 6/46; H01M 6/18; H01M 2/08
[52] U.S. Cl. .......................... 429/127; 429/153; 429/162; 429/185; 429/192
[58] Field of Search .................................. 429/192, 185, 429/127, 162, 153, 149, 152; H01M 6/18

[56] References Cited

U.S. PATENT DOCUMENTS 4,204,036  5/1980  Cohen et al. ................. 429/162 X
4,361,633  11/1982  Nel et al. ..................... 429/162
5,300,373  4/1994  Shackle ....................... 429/152

*Primary Examiner*—John S. Maples
*Attorney, Agent, or Firm*—Leonard Charles Suchyta; Lionel N. White

[57] ABSTRACT

A rechargeable lithium ion battery comprises a plurality of interleaved flexible electrolytic cells, each of which is a unitary planar laminated structure comprising polymeric anode, cathode, and intermediate electrolyte layers disposed between electrically conductive anode and cathode collector foil elements. One of the collector foils of a cell has an open grid structure to allow penetration of electrolyte solution into the cell layer while the other is substantially more continuous to provide supporting strength to the cell. At least a pair of cells having respective continuous foil anode and cathode collectors are interleaved in spiral-folded fashion to present those collector foils at the outer surface of the resulting structure to provide terminal contacts for the resulting high-capacity, low-profile battery.

17 Claims, 10 Drawing Sheets

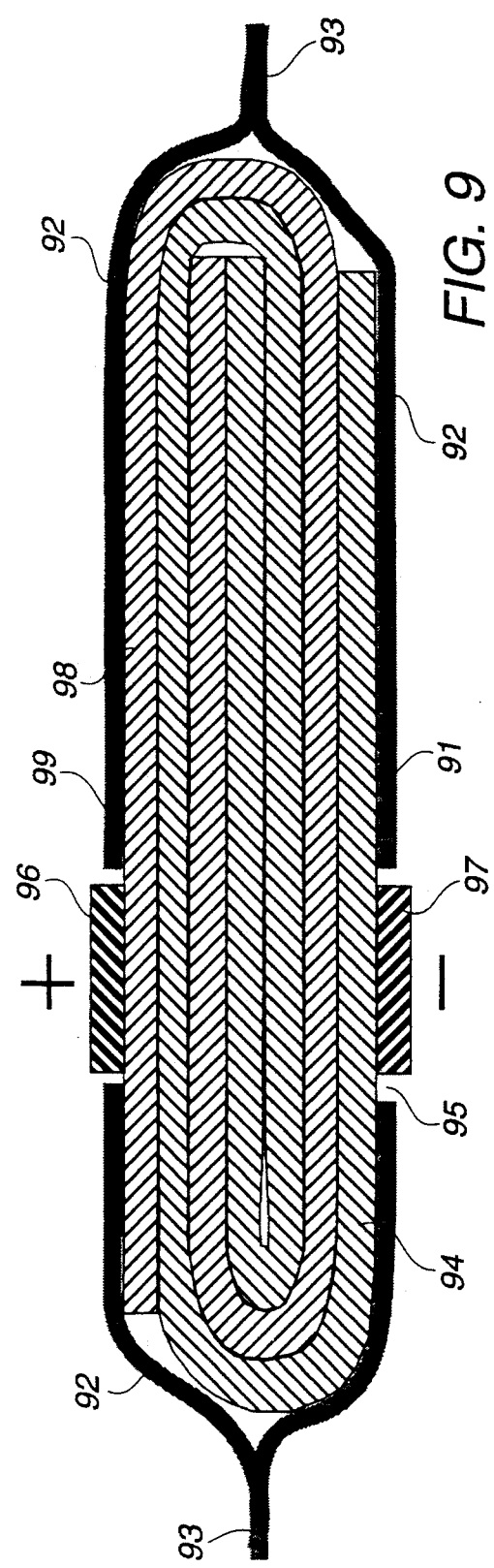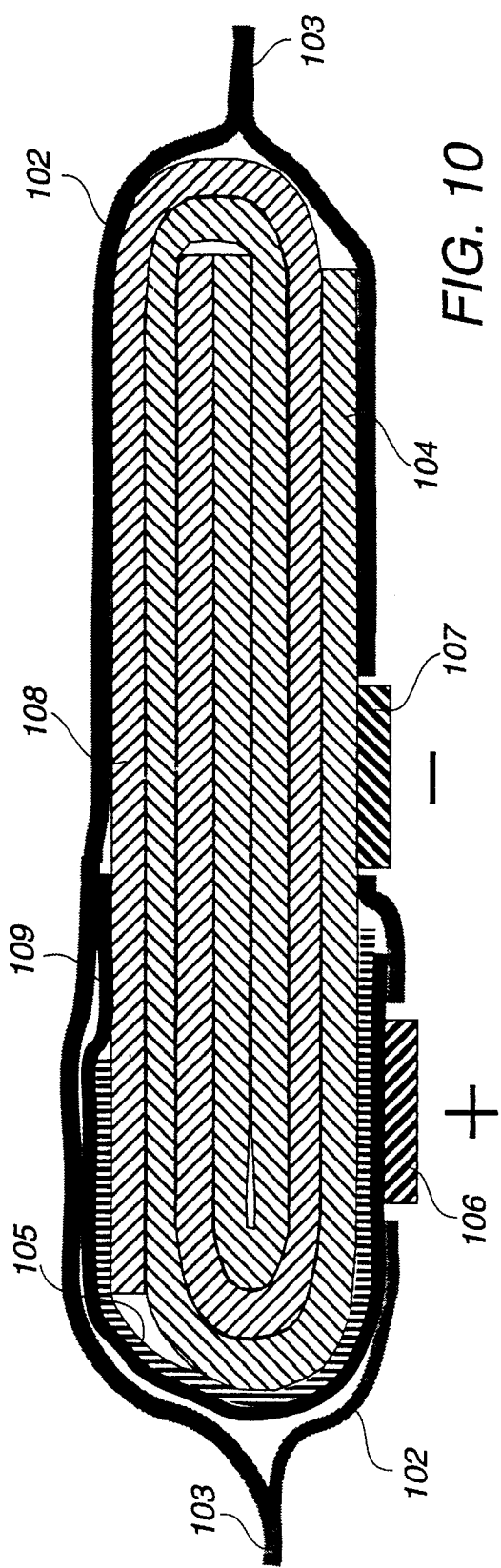

RECHARGEABLE LITHIUM BATTERY CONSTRUCTION

RELATED APPLICATION

This application is a continuation-in-part of U.S. patent application Ser. No. 08/160,018, filed 30 Nov. 1993, the disclosure of which is incorporated herein by reference. That prior application is assigned to the assignee of this application.

BACKGROUND OF THE INVENTION

The present invention relates to electrolytic cells comprising polymeric composition electrode and electrolyte members and to a method of economically making such cells. In particular, the invention relates to rechargeable lithium battery cells comprising an electrode-intermediate polymeric separator element containing an electrolyte solution through which lithium ions from a source electrode material move between cell electrodes during the charge/discharge cycles of the cell. The invention is particularly useful for making such cells in which the ion source electrode is a lithium compound or other material capable of intercalating lithium ions, and where an inter-electrode membrane comprises a plasticized polymeric matrix made ionically conductive by the incorporation of an organic solution of a dissociable lithium salt which provides ionic mobility.

Early rechargeable lithium cells utilized lithium metal electrodes as the ion source in conjunction with positive electrodes comprising compounds capable of intercalating the lithium ions within their structure during discharge of the cell. Such cells relied, for the most part, on porous separator structures or membranes which physically entrained a measure of fluid electrolyte, usually in the form of a solution of a lithium compound, and which also provided a means for preventing destructive contact between the electrodes of the cell. Sheets or membranes ranging from glass fiber filter paper or cloth to microporous polyolefin film or nonwoven fabric were saturated with solutions of a lithium compound, such as $LiClO_4$, $LiPF_6$, or $LiBF_4$, in an organic solvent, e.g., propylene carbonate, diethoxyethane, or dimethyl carbonate, to form such electrolyte/separator elements. The fluid electrolyte bridge thus established between the electrodes provided the necessary $Li^+$ ion mobility for conductivities in the range of about $10^{-3}$ S/cm.

Subsequent developments, such as described in U.S. Pat. No. 5,296,318 have provided electrolytic battery cells which have both positive and negative electrodes comprising compounds capable of intercalating ions and include strong, non-porous, flexible polymeric electrolytic cell separator membrane materials which contain lithium salt electrolyte solutions and remain functional over temperatures ranging well below room temperature. These electrolyte membranes are employed either as separator elements with mechanically assembled battery cell components or in composite battery cells constructed of successively coated layers of electrode and electrolyte compositions. In each of these implementations, however, the polymeric electrolyte/separator elements often contain the lithium electrolyte salts at the time of cell assembly and, due to the hygroscopic nature of those salts, necessitate extraordinary environmental conditions during cell assembly.

More recent developments have provided a manner of utilizing these improved polymeric electrolyte membrane and electrode compositions which substantially eliminates the need for special environmental controls during cell manufacture. Typically, the polymeric electrode and electrolyte/separator layers are thermally bonded to form a laminated cell structure which ensures optimum interlayer reactivity and enables the postponement of sensitive electrolyte incorporation until the final stages of battery construction or even later in its application as an activating fluid.

The laminated layer structure of these cells also provides a ready means for incorporating electrical current collector elements, usually as additional outer conductive layers or foils which can add further strength to the cell assembly. In order to provide optimum access of activating electrolyte solution to the electrode and separator layers, it is preferred that at least one of these outer collector layers, when comprising a normally impermeable material such as metal foil, be of an open grid or mesh structure, perforated, or otherwise similarly formed to allow fluid permeation.

Batteries of various size, capacity, and voltage range can readily be fashioned from the layered cell structure by overlaying a number of cells or manifolding a single cell of extended dimension. Although manifolding is useful in its economy of operations and ability to provide directly, i.e, without additional insulating elements, a proper arrangement of respective electrode collectors, the folding of a perforate or grid collector tends to result in the stress fracture or rupture of that weaker element which may ultimately lead to a significant interruption of current flow to a battery terminal. The present form of battery construction provides a means for alleviating such stresses and, additionally, simplifies the production of battery packages in a variety of sizes, capacities, and voltages.

SUMMARY OF THE INVENTION

Improved electrolytic cell electrode and separator elements utilizing polymeric materials preferably comprise the combination of a poly(vinylidene fluoride) copolymer matrix and a compatible organic plasticizer which maintains a homogeneous composition in the form of a flexible, self-supporting film. The copolymer comprises about 75 to 92% by weight vinylidene fluoride (VdF) and 8 to 25% hexafluoropropylene (HFP), a range in which the latter co-monomer limits the crystallinity of the final copolymer to a degree which ensures good film strength while enabling the retention of about 40 to 60% of preferred solvents for lithium electrolyte salts. Within this range of solvent content, the 5 to 7.5% salt ultimately comprising a hybrid electrolyte membrane yields an effective room temperature ionic conductivity of about $10^{-4}$ to $10^{-3}$ S/cm, yet the membrane exhibits no evidence of solvent exudation which might lead to cell leakage or loss of conductivity.

Electrolytic cells, such as rechargeable battery cells, are generally constructed by means of the lamination of electrode and electrolyte cell elements which are individually prepared, by coating, extrusion, or otherwise, from compositions comprising the noted PVdF copolymer materials. For example, in the construction of a lithium-ion battery, a current collector layer of aluminum foil or grid is overlaid with a positive electrode film or membrane separately prepared as a coated layer of a dispersion of intercalation electrode composition, e.g., a $LiMn_2O_4$ powder in a plasticized copolymer matrix solution, which is dried to form the membrane. An electrolyte/separator membrane formed as a dried coating of a composition comprising a solution of the VdF:HFP copolymer and a plasticizer is then overlaid upon the positive electrode film. A negative electrode membrane formed as a dried coating of a powdered carbon dispersion in a plasticized copolymer matrix solution is similarly overlaid upon the separator membrane layer, and a copper collector foil or grid is laid upon the negative electrode layer to complete the cell assembly. This assembly is then heated under pressure to provide heat-fused bonding between the plasticized copolymer matrix components and to the collector foils or grids to thereby effect the lamination of the cell elements into a unitary flexible battery cell structure.

At this stage the laminated structure comprises a significant measure of homogeneously distributed organic plasticizer, particularly in the separator membrane stratum, yet is devoid of hygroscopic electrolyte salt. As a result, the "inactive" battery cell may be stored at ambient conditions, either before or after being shaped or further processed, without concern for electrolyte deterioration due to reaction with atmospheric moisture. Only when an electrolyte salt solution is introduced to activate the battery cell need there be concern for maintaining anhydrous conditions, as may be effectively achieved in an atmosphere of dry, inert gas.

When it is desired to so activate a battery in the final stage of manufacture or prior to subsequent use, the laminate cell structure is immersed in or otherwise contacted with an electrolyte salt solution which penetrates the permeable collector element and imbibes into the VdF:HFP copolymer membrane matrix to provide substantially the same ionic conductivity enhancement as achieved by a preformed hybrid electrolyte/separator film containing such an electrolyte salt solution. In order to facilitate the absorption of electrolyte solution, it is preferred that a substantial portion of the plasticizer be previously removed from the copolymer matrix. This may be readily accomplished at any time following the laminating operation by immersion of the cell laminate in a copolymer-inert, low-boiling solvent, such as diethyl ether or hexane, which will selectively leach the plasticizer without significantly affecting the copolymer matrix of the cell element strata. The extracting solvent may then be simply evaporated to yield a dry, inactive battery cell. The laminate structure may be stored in plasticized form for an extended period of time prior to activation.

A battery-forming process utilizing the laminated polymer materials is readily adaptable to batch or continuous operation, since the electrode and electrolyte layer elements, as well as the collector grids and foils, may be shaped or sized prior to laminate assembly or they may be laminated from confluent webs of polymer layer materials for later shaping or manifolding. A particular advantage lies in the fact that, unlike those cells of previous practices requiring ultimate element integration, the functional electrolytic cell resulting from the lamination of the layer elements need only be sized and multiplexed, as desired, to obtain completed batteries.

The present invention provides a manner of such cell multiplexing which improves the implementation of the resulting batteries, as well as alleviating a previous disadvantage associated with manipulation of the more fragile perforated foil or grid collector elements of the cell. This problem, a fracturing of the collector element, is attributable primarily to the abrupt bending of that element when situated at the exterior surface of a manifold, or accordion-pleated, battery structure. The invention provides a remedy by utilizing grid or perforate foils as the respective positive and negative collectors of a pair of laminated cells which are then multiplexed in a double-lead concentric fold, or "jelly-roll", assembly which maintains the grid collectors at the interior of the roll, while the complementary solid foil collectors remain at the exterior. In this manner, the stronger foil collectors resist the folding stresses and lend further support to the assembly, while the effect of any fold-induced fracture of a grid collector is mitigated by the conductive continuity maintained by contact between the grid and the matching contiguous solid foil of like polarity in the other assembly cell. Residing at the exterior surfaces of the folded battery structure, the solid foil collectors further ultimately present high-conductivity surfaces which readily receive the respective battery contacts. Numerous battery arrangements with various functional advantages are further made possible by the basic double-lead cell folding construction of this invention.

BRIEF DESCRIPTION OF THE DRAWING

The present invention will be described with reference to the accompanying drawing of which:

FIG. 9 is a sectional view of the compact battery construction of FIG. 7 showing yet another embodiment of an enclosure and terminal contact structure;

FIG. 10 is a sectional view of the compact battery construction of FIG. 7 showing still another embodiment of an enclosure and terminal contact structure;

DESCRIPTION OF THE INVENTION

Figure 1:
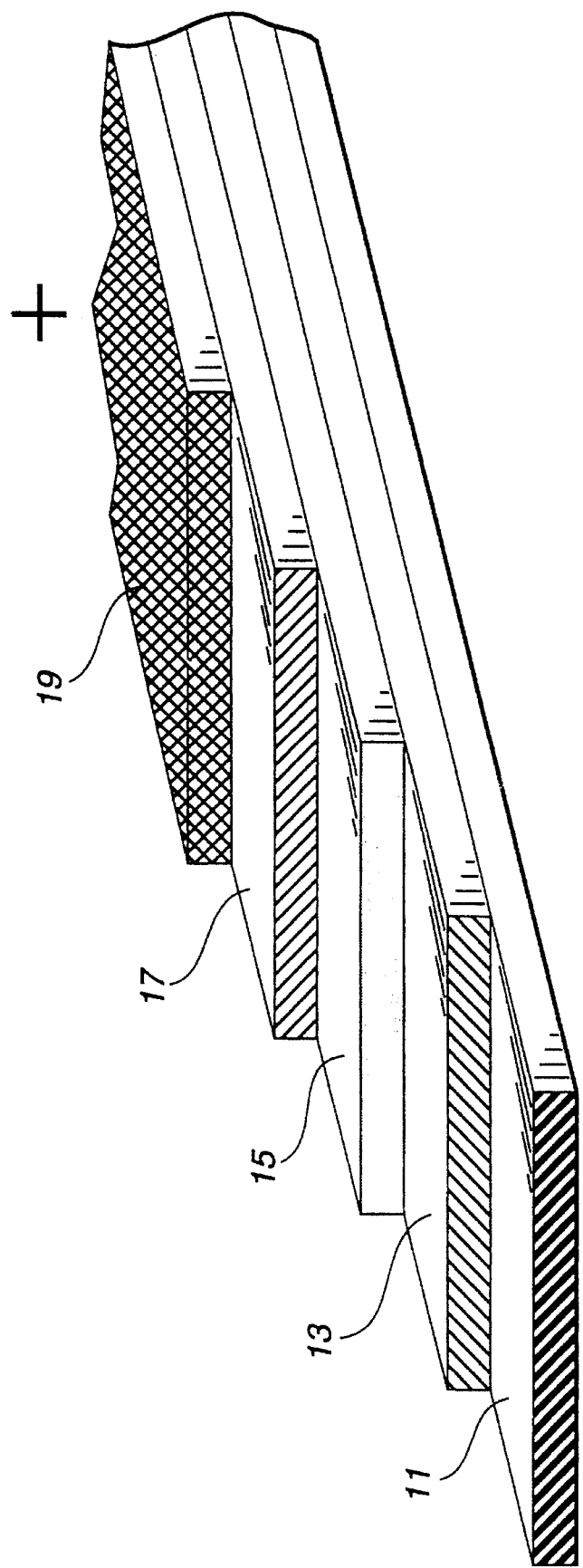
FIG. 1 is a diagrammatic view of a typical laminated lithium-ion battery cell structure utilized in the present invention.

A laminated rechargeable battery cell structure useful in the present invention as depicted in FIG. 1 comprises an electrically-conductive collector foil or grid 11, such as copper, nickel, nickel-plated metal, or high-nickel stainless steel, upon which is laid a negative electrode membrane 13 comprising an intercalatable material, such as carbon or graphite, or a low-voltage lithium insertion compound, such as $WO_2$, $MoO_2$, or Al, dispersed in a plasticized polymeric binder matrix. An electrolyte/separator film membrane 15 of plasticized VdF:HFP copolymer is positioned upon electrode element 13 and is covered with a positive electrode membrane 17 comprising a composition of a finely-divided lithium intercalation compound, such as $LiMn_2O_4$, $LiCoO_2$, or $LiNiO_2$, in a plasticized polymeric binder matrix. An aluminum collector foil or grid 19 completes the assembly which is then pressed between platens (not shown) under heat and pressure to soften and bond the polymeric components and laminate the membrane and collector layers. As previously noted, at least one of the cell collector foils is preferably preformed as a permeable grid to facilitate the flow of activating solution into the cell. Simply for ease and consistency of illustration, the positive collector is depicted in the first few Figures as such a grid.

Separator membrane element 15 is generally prepared from a composition comprising the earlier-noted 75 to 92% vinylidene fluoride:8 to 25% hexafluoropropylene copolymer (available commercially from Atochem North America as Kynar FLEX) and an organic plasticizer. Such a copolymer composition is also preferred for the preparation of the electrode membrane elements, since subsequent laminate interface compatibility is ensured. The plasticizer may be one of the various organic compounds commonly used as solvents for electrolyte salts, e.g., propylene carbonate or ethylene carbonate, as well as mixtures of these compounds. Higher-boiling plasticizer compounds, such as dibutyl phthalate, dimethyl phthalate, diethyl phthalate, and tris butoxyethyl phosphate are particularly suitable. Inorganic filler adjuncts, such as fumed silica, fumed alumina, or silanized fumed silica, may be used to enhance the physical strength and melt viscosity of a separator membrane and to increase the subsequent level of electrolyte solution absorption.

Any common procedure for casting or forming films or membranes of polymer compositions may be employed in the preparation of the present membrane materials. Where casting or coating of a fluid composition is used, e.g., with meter bar or doctor blade apparatus, the viscosity of the composition will normally be reduced by the addition of a readily evaporated casting solvent, such as acetone, tetrahydrofuran (THF), or the like. Such coatings are normally air-dried at moderate temperature to yield self-supporting films of homogeneous, plasticized copolymer compositions. A membrane material, particularly for use as a separator element, may also be formed by allowing the copolymer in commercial form, i.e., bead or powder, to swell in a proportionate amount of plasticizer and then pressing the swollen mass between heated (e.g., about 110° to 150° C.) plates or rollers, or extruding the mixture.

Figure 2:
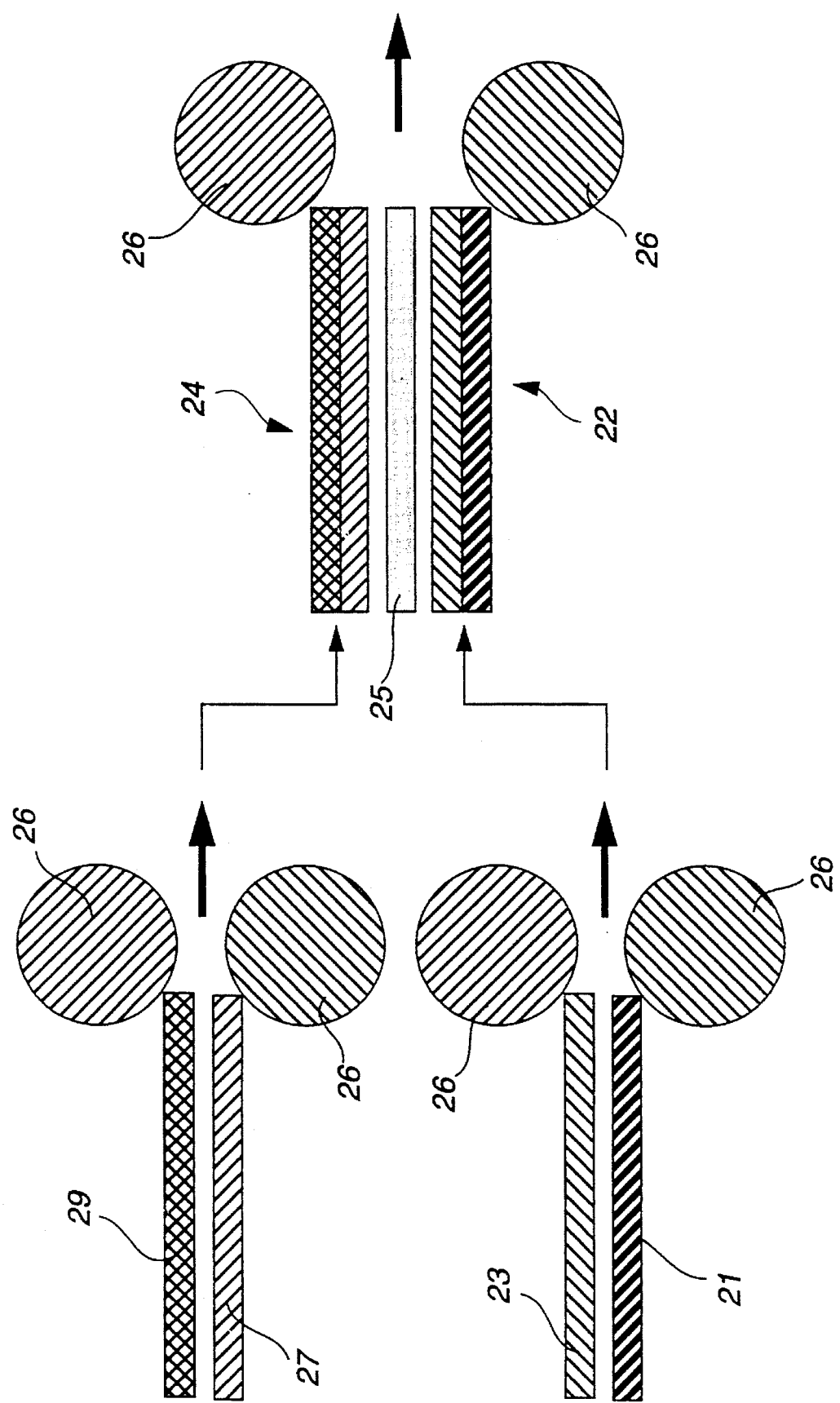
FIG. 2 is a diagrammatic representation of a laminating process for preparing a battery cell structure of FIG. 1.

Lamination of assembled cell structures may similarly be accomplished by commonly-used apparatus. Preshaped or sized assemblies may be simply pressed for a short while between metal plates weighted at about $3 \times 10^4$ to $5 \times 10^4$ Pa in an oven at a temperature of about 110° to 150° C. Where continuous webs of component membranes are available, the operation may be carried out using heated calender rollers. In such a laminate battery assembly method, as depicted in FIG. 2, a copper collector foil 21 and a negative electrode element 23 are arranged in overlay fashion, preferably between buffer sheets of aluminum foil (not shown), and are passed through the rolls 26 of a commercial card-sealing laminator at a temperature of about 110° to 150° C. A treated aluminum collector grid 29 and a positive electrode element 27 are similarly laminated to provide a pair of electrode/collector battery elements 22, 24. An electrolyte/separator element 25 is then inserted between the electrode/collector pair 22, 24 and the resulting assembly is passed through the laminator device at a roll temperature of about 110° to 150° C. with somewhat less pressure to obtain the laminate battery cell structure.

Figure 3:
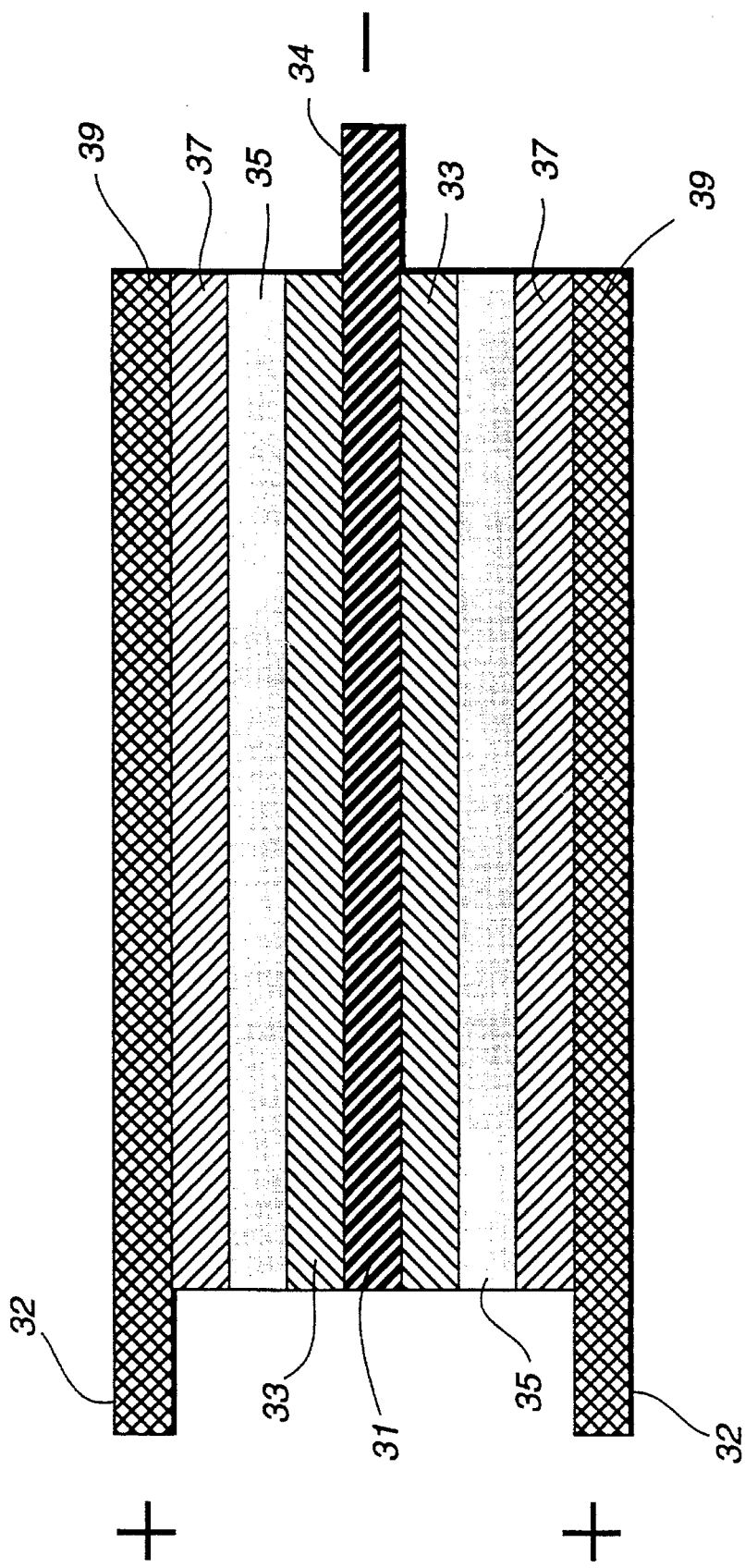
FIG. 3 is a diagrammatic sectional view of a multicell battery structure utilizing the basic cell elements of FIG. 1.

The foregoing procedure may be employed to prepare cells of higher capacity by duplicating within the cell structure the appropriate electrode and electrolyte elements. Such a multiplex configuration is depicted in FIG. 3 and comprises copper collector 31, negative electrode layer elements 33, electrolyte/separator elements 35, positive electrode elements 37, and aluminum collector grid elements 39. Tabs 32, 34 of the collector elements form respective common terminals for the battery structure. Subsequent lamination, extraction, and activation with electrolyte solution produces a battery cell of about twice the capacity of the basic cell shown in FIG. 1. Battery cells of proportionately greater capacity can readily be constructed by repeating, as desired, the sequences of cell elements as desired. Consideration should, of course, be given to the anticipated increase in processing time occasioned by the increased mass of material through which extraction and activation fluids will pass.

Subsequent to lamination, the battery cell material may be stored under normal conditions with the retained plasticizer for any length of time prior to final battery processing and activation. The laminate may be die-punched into coins for use in the familiar "button" batteries or elongated sheets of the flexible laminated cell material may be rolled with an interposed insulator or manifolded, as depicted in FIG. 4, to yield a compact, high-density structure to be sealed in a protective enclosure with activating electrolyte solution.

Figure 4:
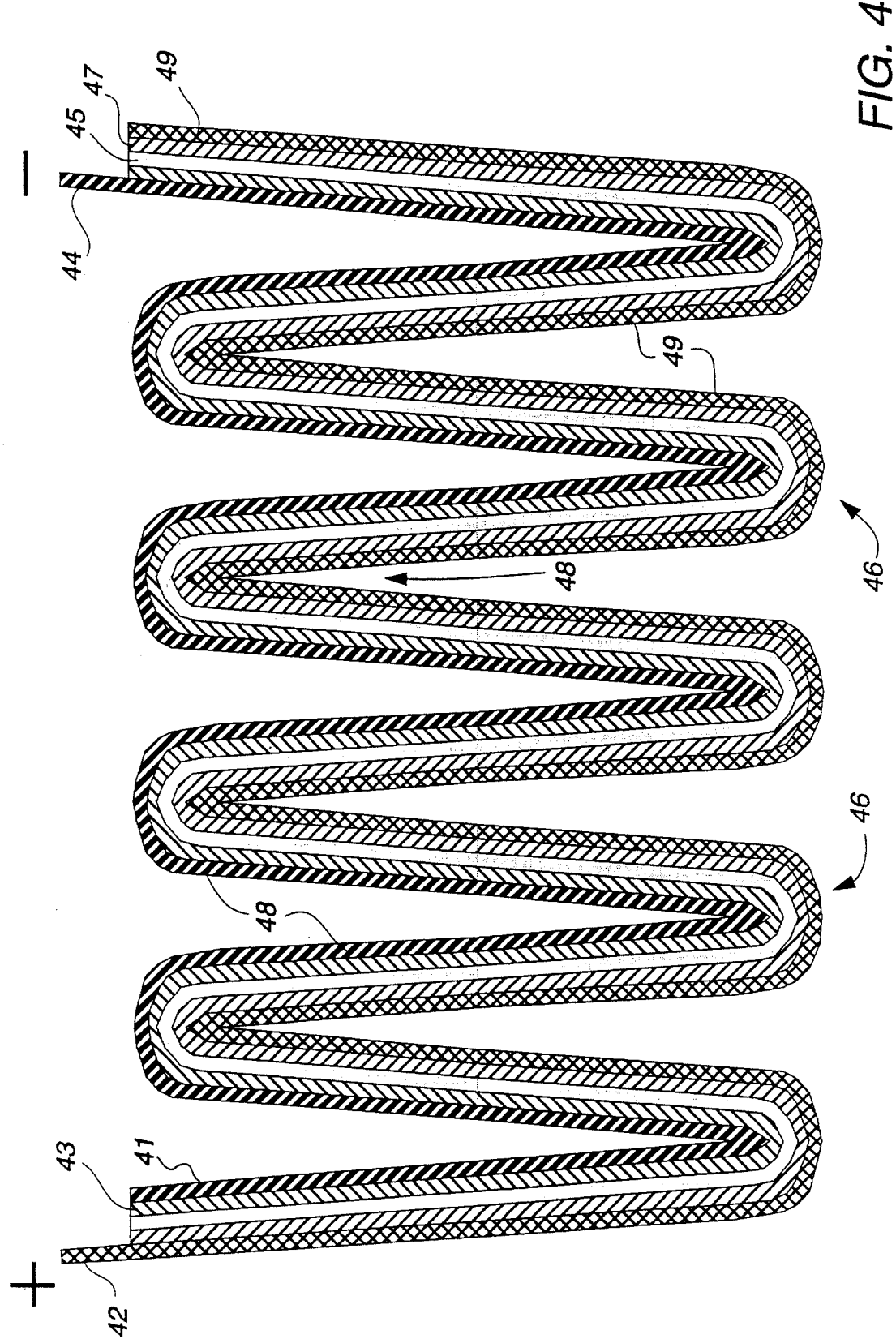
FIG. 4 is a diagrammatic sectional view of a manifold battery structure utilizing the basic cell elements of FIG. 1.

The manifold cell of FIG. 4, shown there as only partially folded for clarity of illustration, may typically be prepared in the following exemplary manner. A negative electrode coating composition was prepared by stirring in a lid-covered glass vessel a mixture of 7.0 g commercial micro-crystalline graphite (about 5 μm), 2.0 g 88:12 VdF:HFP copolymer (Atochem Kynar FLEX 2822), 3.12 g dibutyl phthalate, 0.37 g Super-P conductive carbon, and about 28 g acetone. The resulting paste may be degassed by briefly applying a reduced pressure to the mixing vessel. A portion of the composition was coated on a glass plate with a doctor blade device gapped at about 0.66 mm. The coated layer was allowed to dry within the coating enclosure under moderately flowing dry air at room temperature for about 10 min to yield a tough, elastic film which was readily stripped from the glass plate. The film was about 0.16 mm thick with a dry basis weight of about 0.23 kg/m² and was easily cut into negative electrode element 43 of about 600×40 mm.

A 620×40 mm copper collector foil 41 was trimmed at one end to form a tab 44 which would subsequently serve as a convenient battery terminal. To enhance the ensuing adherence to its associated electrode element, foil 41 was dip-coated in a 0.5% acetone solution of the FLEX 2822 VdF:HFP copolymer, air-dried, and oven-heated at about 330° to 350° C. for 5–20 seconds. The heating step may be eliminated by using a dip coating solution of about 3% each of the VdF:HFP copolymer and dibutyl phthalate, or a coating of ethylene-acrylic acid copolymer primer composition (e.g., Morton 50-C-12). The resulting negative foil collector 41 was then laminated with negative electrode membrane 43 in the described manner to form a negative electrode/collector cell subassembly.

A similarly sized positive electrode/collector subassembly was formed by laminating an acetone-cleaned and polymer dip-coated open mesh aluminum grid 49 of about 50 μm thickness (e.g., a MicroGrid precision expanded foil marketed by Delker Corporation) to a positive electrode membrane 47 prepared from a stirred homogeneous mixture of 10.5 g of $Li_{1+x}Mn_2O_4$, where $0<x\leq1$ (e.g., $Li_{1.05}Mn_2O_4$ prepared in a manner described in U.S. Pat. No. 5,196,279), sieved through 53 μm, 1.61 g of the VdF:HFP copolymer (FLEX 2822), 1.63 g dibutyl phthalate, 0.5 g Super-P conductive carbon, and about 16 g acetone. The composition was coated at a blade gap of about 1.1 mm to yield an electrode film with dry basis weight of about 0.6 kg/m$^2$.

The electrode/collector subassembly pair were laminated, as in the procedure depicted in FIG. 2, with a 600×40 mm strip of an electrolyte/separator element 45. The membrane coating solution for element 45 was prepared by suspending 2.0 g of the VdF:HFP copolymer (FLEX 2822) in about 10 g of acetone and 2.0 g of dibutyl phthalate (DBP) and warming the mixture to about 50° C. with occasional agitation to facilitate dissolution. A portion of the solution was coated on a glass plate with a doctor blade device gapped at about 0.5 mm and air dried for about 10 min to yield the tough, elastic electrolyte/separator membrane 45 which was about 85 μm thick with a dry basis weight of about 0.1 kg/m$^2$. The sheet was then folded in zig-zag fashion as depicted in FIG. 4 and pressed into a tight manifold structure in which only respective outer portions of the separate continuous positive and negative collector surfaces 49, 41 were in contact.

The manifold battery structure was then immersed in stirred diethyl ether three times for about 10 minutes each during which the ether solvent penetrated between the structure surfaces and through the grid of collector 49 to extract a substantial portion of the DBP plasticizer. The manifold battery cell was thereafter activated in preparation for charge/discharge cycling by immersion under a substantially moisture-free atmosphere in a 1M electrolyte solution of LiPF$_6$ in 50:50 ethylene carbonate (EC): dimethyl carbonate (DMC) for at least 20 minutes during which the laminated cell imbibed about 31% of its extracted weight. Following a mild wiping with absorbent materials to remove surface electrolyte, the activated battery structure was hermetically heat-sealed, but for the extending terminal tabs 42, 44, in a close-fitting envelope (not shown) of moisture-proof barrier material, such as polyolefin/aluminum foil/polyester laminate sheeting commercially used for foodstuff enclosures.

The battery structures of the present invention may be activated with any of the numerous compositions used as liquid electrolyte solutions. Notably, the electrolyte solutions may comprise such organic solvents as dimethyl carbonate, ethylene carbonate, diethoxyethane, diethyl carbonate, propylene carbonate, dimethoxyethane, dipropyl carbonate, and mixtures thereof. Also, in the formulation of the activating electrolyte solutions, other useful lithium salts, including LiClO$_4$, LiN(CF$_3$SO$_2$)$_2$, LiBF$_4$, LiCF$_3$SO$_3$, LiAsF$_6$, and LiSbF$_6$, may be employed in solution concentrations of between about 0.5 and 2M. Of particular utility are the exceptional ethylene carbonate/dimethyl carbonate compositions of LiPF$_6$ and mixtures with LiBF$_4$ described in U.S. Pat. No. 5,192,629.

During the manifolding operation, it was noted that the abrupt bending of open mesh collector grid 49 at each of the structure folds caused a number of fractures of the relatively weak grid material in those areas. Although such fractures were of little consequence at the internal folds 48 due to the contiguity of the facing surfaces of grid 49, fractures at exterior folds 46 resulted in deleterious disruptions in the continuity of that collector element. In response to this problem, the following flexible battery cell assembly of the present invention was developed.

Figure 5:
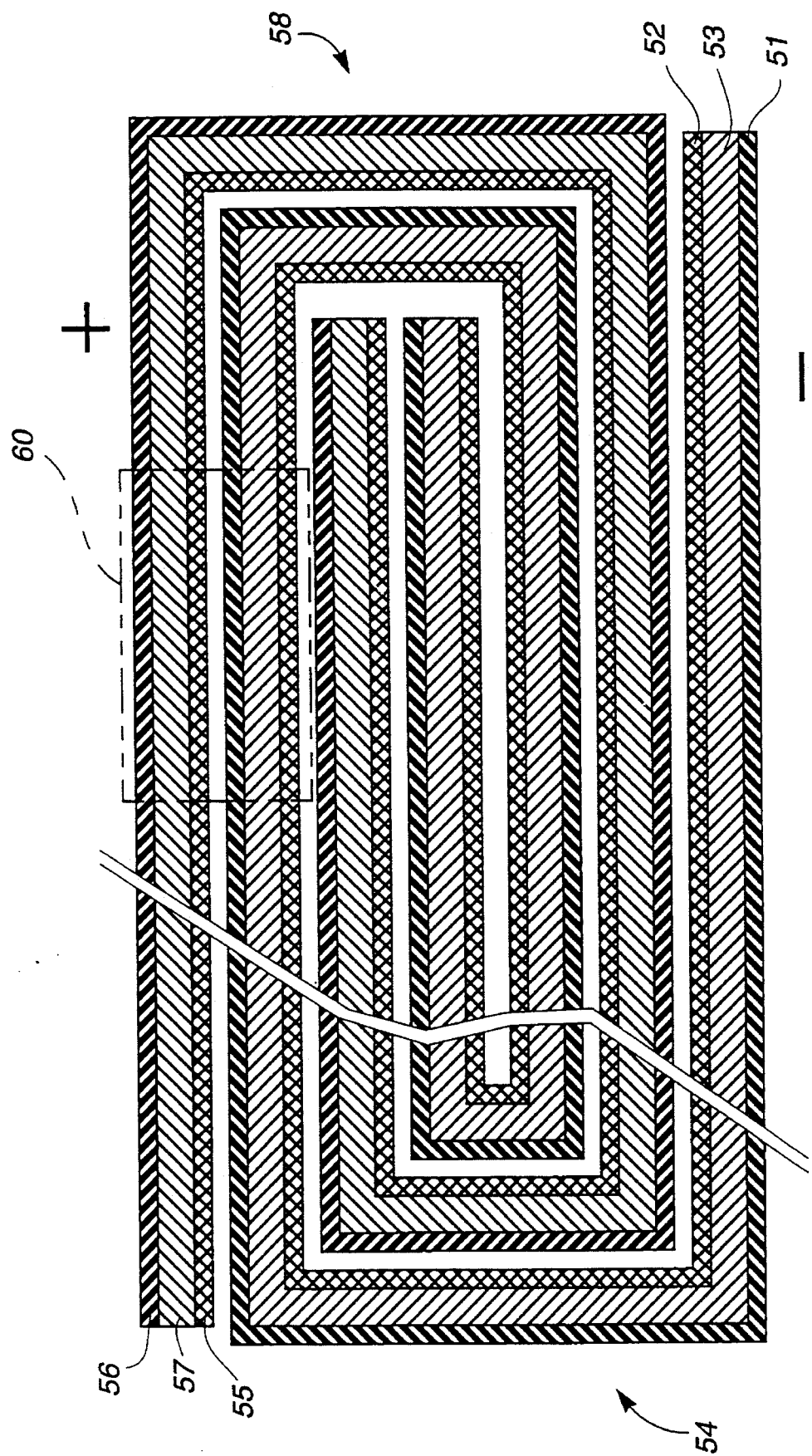
FIG. 5 is a diagrammatic sectional view of a double-lead folded cell battery construction of the present invention.

This advantageous cell assembly is shown in FIG. 5 in partly-expanded diagrammatic form to facilitate illustration of the novel arrangement of the cell elements within the structure. Further in this vein, the elements of a cell, for example cell 54, have been shown merely as a foil collector 51, a grid collector 52, and, disposed between the collectors, an element 53 which is in fact the previously described combination of positive electrode/electrolyte membrane/negative electrode. As further indicated, the assembly may be of any desired composite length and, as well, may be of any number of folds or wraps.

The purpose of the present cell arrangement is, primarily, to avoid the external folding stresses on open mesh collector grid materials which ultimately lead to element fracture. An additional advantage is enjoyed, however, in the disposition of solid foil collector elements at the exterior of the cell where they lend strength and protection and provide a ubiquitous receptor surface for the application of electrical terminals, leads, and contacts.

Figure 6:
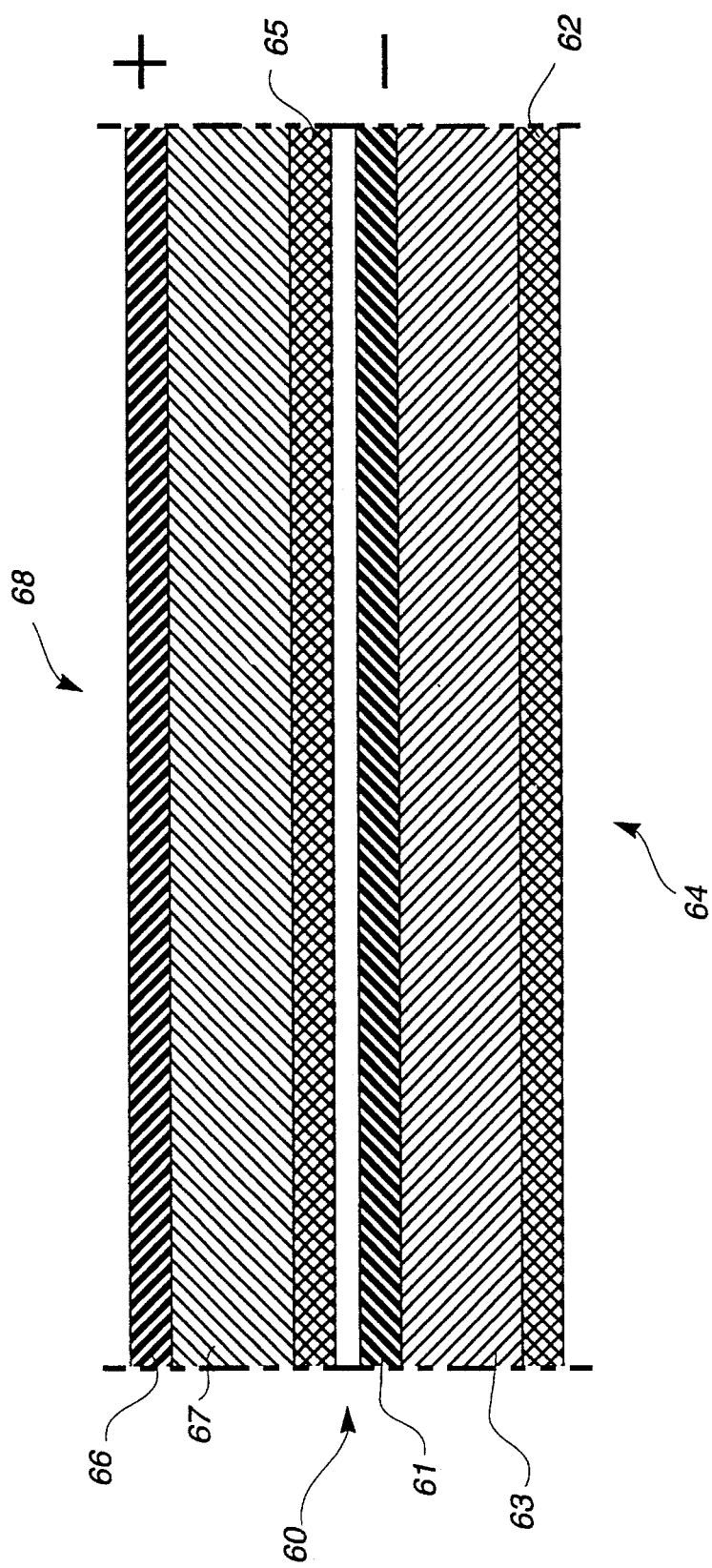
FIG. 6 is an enlarged view of the battery construction section taken from FIG. 5 at phantom enclosure 60.

As depicted in FIG. 5, a cell of the present invention comprises a pair of subcells 54, 58 which are, in essence, inverse images of one another. That is, the negative collector of subcell 54 is solid foil 51, while that of subcell 58 is grid 55. On the other hand, the positive collector of subcell 54 is grid 52, while that of subcell 58 is solid foil 56. This key arrangement may be viewed more clearly in the enlarged section 60 of the structure shown in FIG. 6. There, subcell 64 negative collector foil 61 of, for example, copper contacts subcell 68 negative grid 65, also of copper. The complementary subcell positive foil and grid collectors 62, 66 of, for example, aluminum will likewise be in contact in alternating layers of the folded construction.

To form the new cell construction, the subcells are overlaid so that one pair of like collectors, e.g., negative elements 51, 55, are in contact, and the elongate double-layer composite is folded, in a double lead "jelly roll" fashion, with the exterior solid foil element at all times constituting the exterior of the folded structure. As is evident in FIG. 5, the innermost subcell of the folded pair is sized to extend beyond the other in order, thereby, to be situated at the exterior of the structure for at least a portion, preferably about half, of its circumference. In this manner, the grid elements are subjected only to interior folding stresses and are supported by solid foils of like polarity, yet substantial solid foil surfaces of both polarities are presented at the surface of the final battery cell.

In the following Figures depicting completed battery constructions of the invention, each of the subcells has been further reduced to a single element for ease and clarity of illustration. Thus, in FIG. 7, for instance, elements 74, 78 correspond to subcells 54, 58 of FIG. 5 and should be understood to comprise all of the collector, electrode, and electrolyte layers of a complete cell, as exemplified in FIG. 1. The compressed cell depiction of the folded structures in these latter Figures more closely resemble the actual state of the battery elements.

Figure 7:
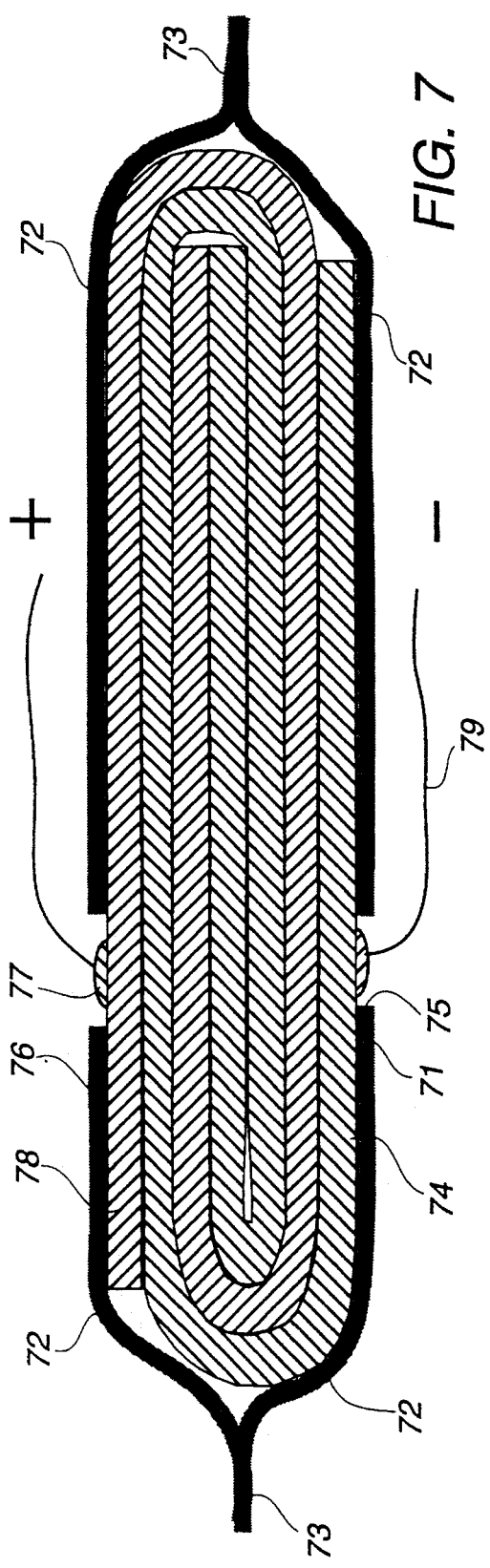
FIG. 7 is a sectional view of a compact battery construction according to FIG. 5 showing an enclosure and terminal contact structure embodiment.

In the embodiment shown in FIG. 7, the folded cell comprising subcell elements 74, 78 may be treated in the manner described with respect to the folded cell of FIG. 4 prior to being sealed in enclosure 72. In particular, the folded construction may be extracted of plasticizer and activated with electrolyte solution. Alternatively, the folded cell may be activated without prior extraction or an extracted cell may be sealed in the enclosure with a predetermined amount of activating electrolyte solution which will be imbibed substantially entirely into the cell. In this latter process, the activating solution may be injected through the enclosure envelope of a previously sealed battery with subsequent heat-healing at the point of injection.

As shown in particular in FIG. 7, this embodiment comprises the double-lead folded cell structure of complementary elements 74, 78 sealed within two sheets of commercially-available moisture-proof enclosure film 72 typically comprising an outer 15 μm polyester or polyamide film, a 50 μm aluminum foil, and an inner 15 μm polyester film bearing about a 90 μm layer of heat-seal adhesive. In addition to forming an hermetic cohesive seal, the adhesive provides good bonding to metal at temperatures in the range of about 100°–125° C. In an initial sealing step, the enclosure sheets 72, with punched electrode access holes 75, are adhered to the foil electrode surfaces 71, 76 of cell elements 74, 78, thus sealing the exposed areas of the electrodes from the interior of the final enclosure which is then completed by sealing the sheets together at their edges 73. Conductor leads 79 may thereafter be affixed to the respective exposed cell electrodes by means of solder 77 or other conductive adherent, such as silver-filled epoxy.

Figure 8:
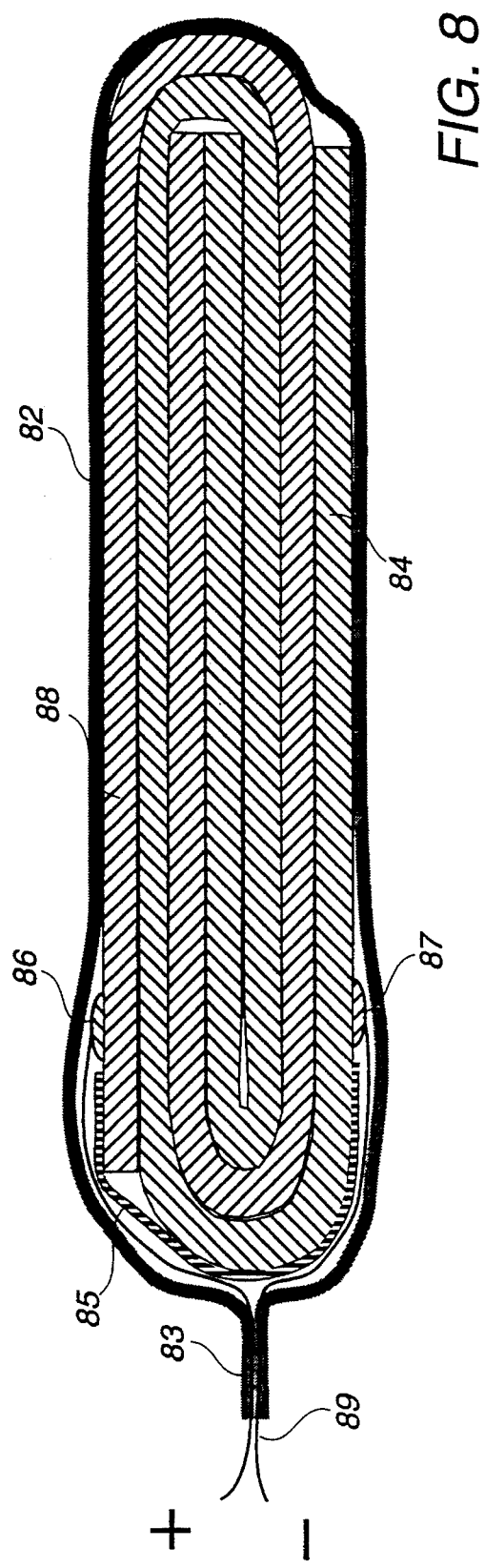
FIG. 8 is a sectional view of the compact battery construction of FIG. 7 showing another embodiment of an enclosure and terminal contact structure.

A variation in the protective packaging of the folded cell is shown in FIG. 8 where a single sheet of enclosure material 82, which might be a preformed bag, is employed. Here, conductors 89 may be affixed to respective electrode surfaces of complementary cell elements 84, 88 with solder 87, 86 before the cell is inserted into the bag with a measure of electrolyte solution, if so processed, and, if conductors 89 lack individual insulation, with an adhered insulation film 85. Heat-sealing the mouth area 83 of the enclosure serves also to separate and insulate conductors 89.

Yet another variation from the battery structure of FIG. 7 is shown in FIG. 9 where firm contacts 96, 97 of, for example, copper pads are respectively affixed with solder or conductive adhesive to electrode surfaces 99, 91 accessible through holes 95 in envelope material 92. Such a battery is thereby adapted for direct contact insertion into a utilizing device. The embodiment of FIG. 10 provides similar terminal pads which are located on the same surface of the battery package. An insulating film 105 enables the use of a simple adhered conductor foil 109 to convey current between cell element 108 and terminal 106, while terminal 107 is adhered directly to cell element 104.

Figure 11:
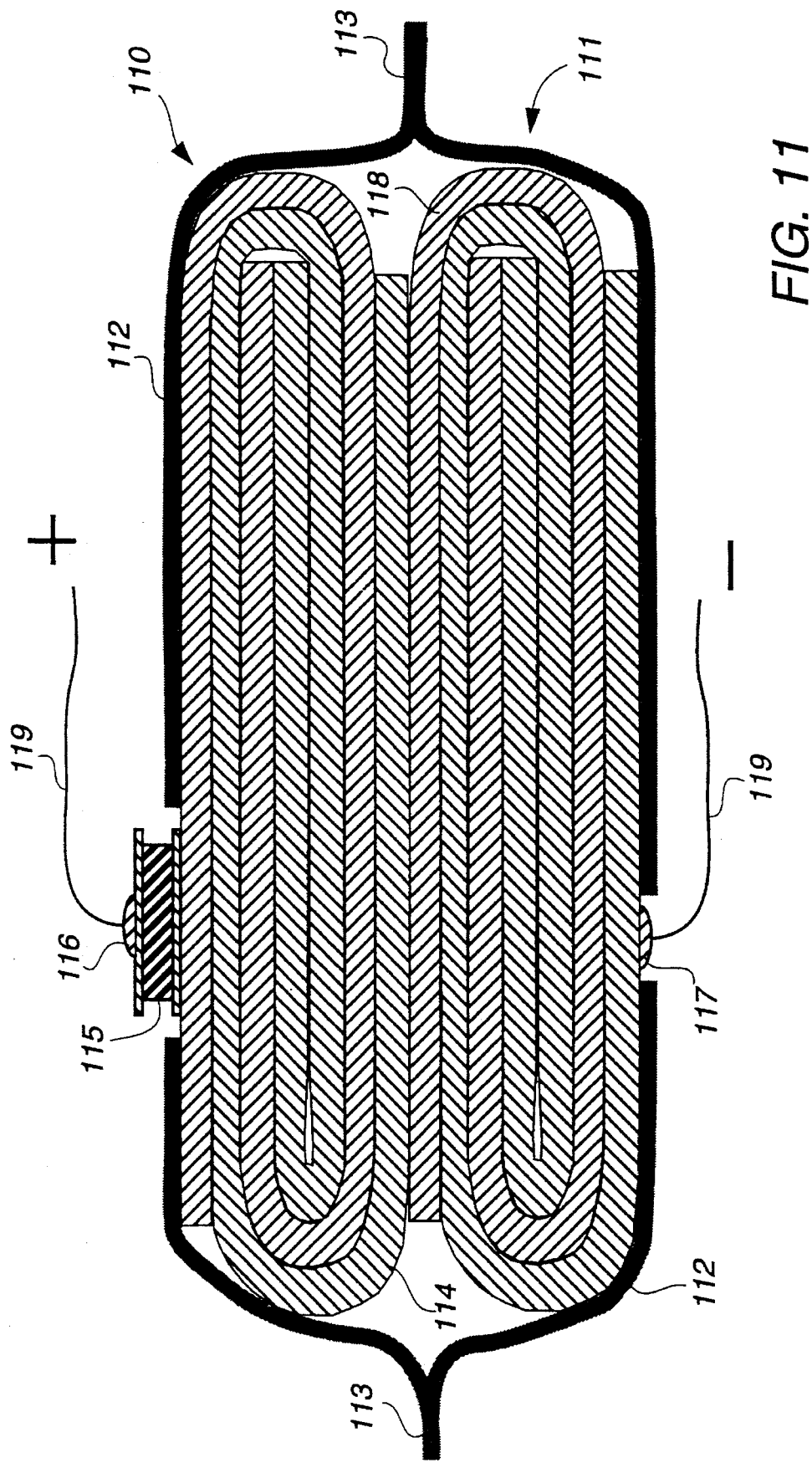
FIG. 11 is a sectional view of an increased voltage battery utilizing a series couple of the FIG. 7 compact battery construction.

The voltage output of a battery of the present construction may readily be increased by series multiplexing of a plurality of the basic folded-cell structure of FIG. 5. As shown in FIG. 11, the negative electrode element 114 of a first folded cell 110 is placed in electrical contact with the positive electrode element 118 of a similar cell 111 prior to sealing the series couple at the cell surfaces and closure areas 113 of envelope materials 112 with the desired amount of activating electrolyte. The battery voltage is thus doubled with the two-cell structure shown. In addition to the earlier-noted affixing of conductors 119 with solder connections 116, 117, the depicted battery package includes a commercially-available current- and thermal-protective PTC switch 115, such as the Poly-Switch device manufactured by RayChem Corp. of Menlo Park, Calfi. As a compact alternative to the use of a separate protection switch device, the present flexible, multilayer construction may include an additional layer within a cell structure, for instance between an electrode and collector layer, which comprises the thermally-sensitive composition of a PTC switch.

Figure 12:
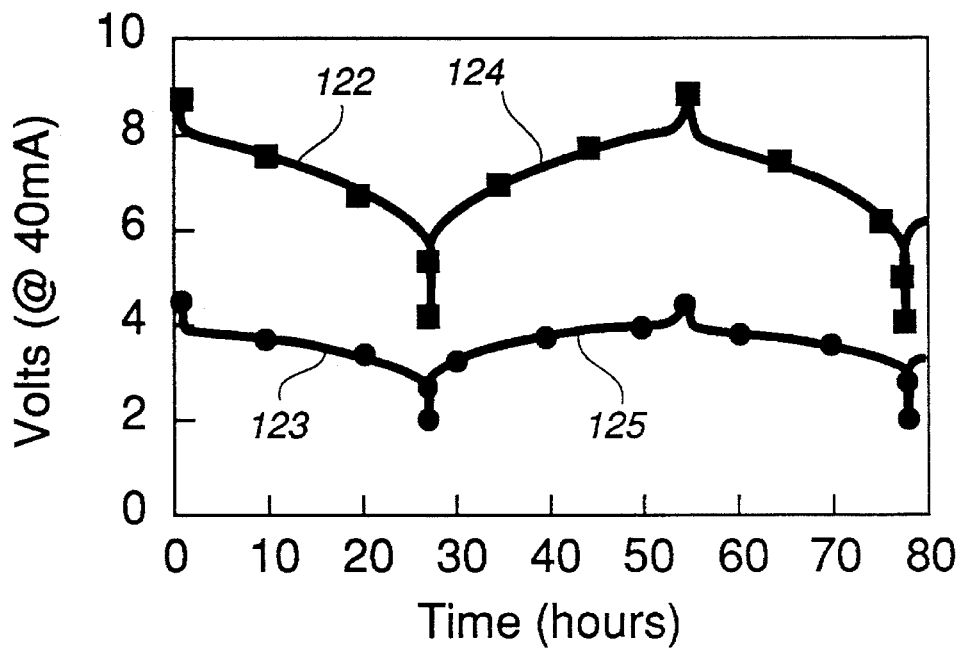
FIG. 12 is a graph tracing recycling voltage as a function of time for lithium-ion battery cells according to FIG. 7 and FIG. 11.
Figure 13:
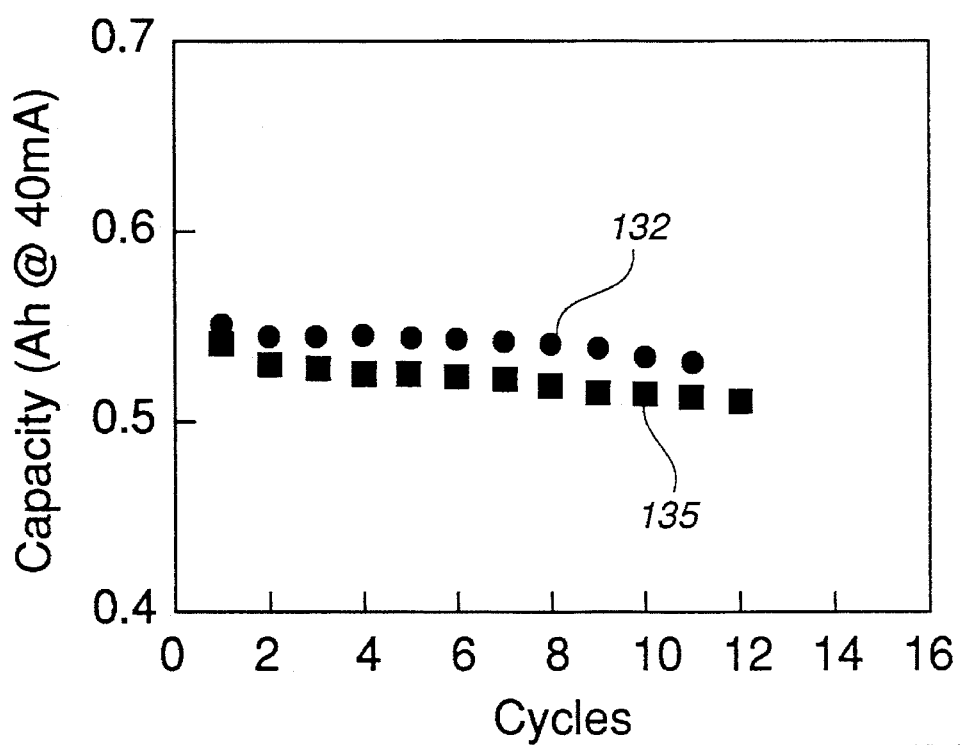
FIG. 13 is a graph of capacity as a function of the number of charge/discharge cycles for lithium-ion battery cells according to FIG. 7 and FIG. 11.

Activated batteries of FIGS. 11 and 7 were tested by cycling over ranges of 4–9 V and 2–4.5 V, respectively, at a rate of 40 mA which was maintained constant within 1%. Multicycle traces of the resulting data are shown in FIG. 12 where 122, 123 and 124, 125 are the respective discharge and charge traces. The traces of cell capacity over extended charging cycles are shown in FIG. 13 where 132 traces the substantially constant capacity of the higher voltage battery of FIG. 11, while similar performance of the single cell battery of FIG. 7 is shown at trace 135.

While the above description has related in large measure the preparation of a number of battery assemblies, other variants are likewise to be included within the scope of the invention as set out in the appended claims.

What is claimed is:

1. A rechargeable battery construction comprising a plurality of flexible electrolytic cell positive electrode element, negative electrode element, and separator elements, each of said elements being of polymeric composition, arranged in continuous concentrically overlapping layers
   characterized in that
   a) said elements are arranged to form at least two cells of which each cell comprises a positive electrode element, a negative electrode element, and a separator element disposed therebetween; and
   b) the respective like-polarity electrodes of each cell are disposed contiguously within said construction.

2. A battery construction according to claim 1
   characterized in that each of said electrodes comprises an electrolytically active composition element and an electrically conductive collector element.

3. A battery construction according to claim 2
   characterized in that the respective collector elements of said like-polarity electrodes are disposed contiguously within said construction.

4. A battery construction according to claim 3
   characterized in that one of the respective collector elements of each said like-polarity electrodes is permeable to a fluid electrolyte.

5. A battery construction according to claim 4
   characterized in that said permeable collector elements comprise the cell layers disposed closest to the interior of said concentrically overlapping arrangement.

6. A battery construction according to claim 5
   characterized in that a respective one of the opposite-polarity collector elements of the cells is disposed at the outer surface of said concentrically overlapping arrangement.

7. A rechargeable battery construction comprising a plurality of electrolytic cells of which each cell comprises a positive electrode member, a negative electrode member, and a separator member disposed therebetween, said members having flexible, self-supporting, polymeric matrix film composition and being bonded to contiguous members at respective interfaces to form a unitary flexible laminate cell,
   characterized in that
   a) the respective like-polarity electrodes of at least two of said cells are disposed contiguously within said construction; and
   b) the members of said two cells are arranged in continuous concentrically overlapping layers.

8. A battery construction according to claim 7
   characterized in that each of said electrode members comprises an electrolytically active composition element and an electrically conductive collector element.

9. A battery construction according to claim 8
   characterized in that the respective collector elements of said like-polarity electrodes are disposed contiguously within said construction.

10. A battery construction according to claim 9
    characterized in that one of the respective collector elements of each said like-polarity electrodes is permeable to a fluid electrolyte.

11. A battery construction according to claim 10 characterized in that said permeable collector elements comprise the cell layers disposed closest to the interior of said concentrically overlapping arrangement.

12. A battery construction according to claim 11 characterized in that a respective one of the opposite-polarity collector elements of said cells is disposed at the outer surface of said concentrically overlapping arrangement.

13. A rechargeable battery construction comprising a plurality of electrolytic cells of which each cell comprises a positive electrode member, a negative electrode member, and a separator member disposed therebetween, said members having flexible, self-supporting, polymeric matrix film composition and being bonded to contiguous members of said cell at respective interfaces to form a unitary flexible laminate cell, characterized in that
  a) each of said electrode members comprises an electrolytically active composition element and an electrically conductive collector element;
  b) at least one of said collector elements of each cell is permeable to a fluid electrolyte;
  c) the respective like-polarity collector elements of at least two of said cells are disposed contiguously within said construction;
  d) the members of said two cells are formed into a structure having a continuous concentrically overlapping layer arrangement;
  e) said permeable collector elements comprise the cell layers disposed closest to the interior of said overlapping arrangement structure; and
  f) a respective one of opposite-polarity collector elements of said cells is disposed at the outer surface of said structure.

14. A battery construction according to claim 13 characterized in that said overlapping arrangement structure is hermetically sealed within a moisture-proof barrier material enclosure.

15. A battery construction according to claim 14 characterized in that said construction comprises means individually communicating electrically between said opposite-polarity collector elements and the exterior of said enclosure.

16. A battery construction according to claim 15 characterized in that said construction comprises a measure of cell-activating electrolyte solution sealed within said enclosure.

17. A battery construction according to claim 16 characterized in that
  a) said construction comprises at least two of said overlapping arrangement structures sealed within said enclosure;
  b) respective opposite-polarity collector elements of said structures are in electrical communication; and
  c) the respective complementary opposite-polarity collector elements outermost in said construction are in electrical communication with the exterior of said enclosure.

* * * * *